Nov. 27, 1934.  J. GLASSON  1,982,425
BORE CUTTING APPARATUS
Filed April 6, 1933   2 Sheets-Sheet 2
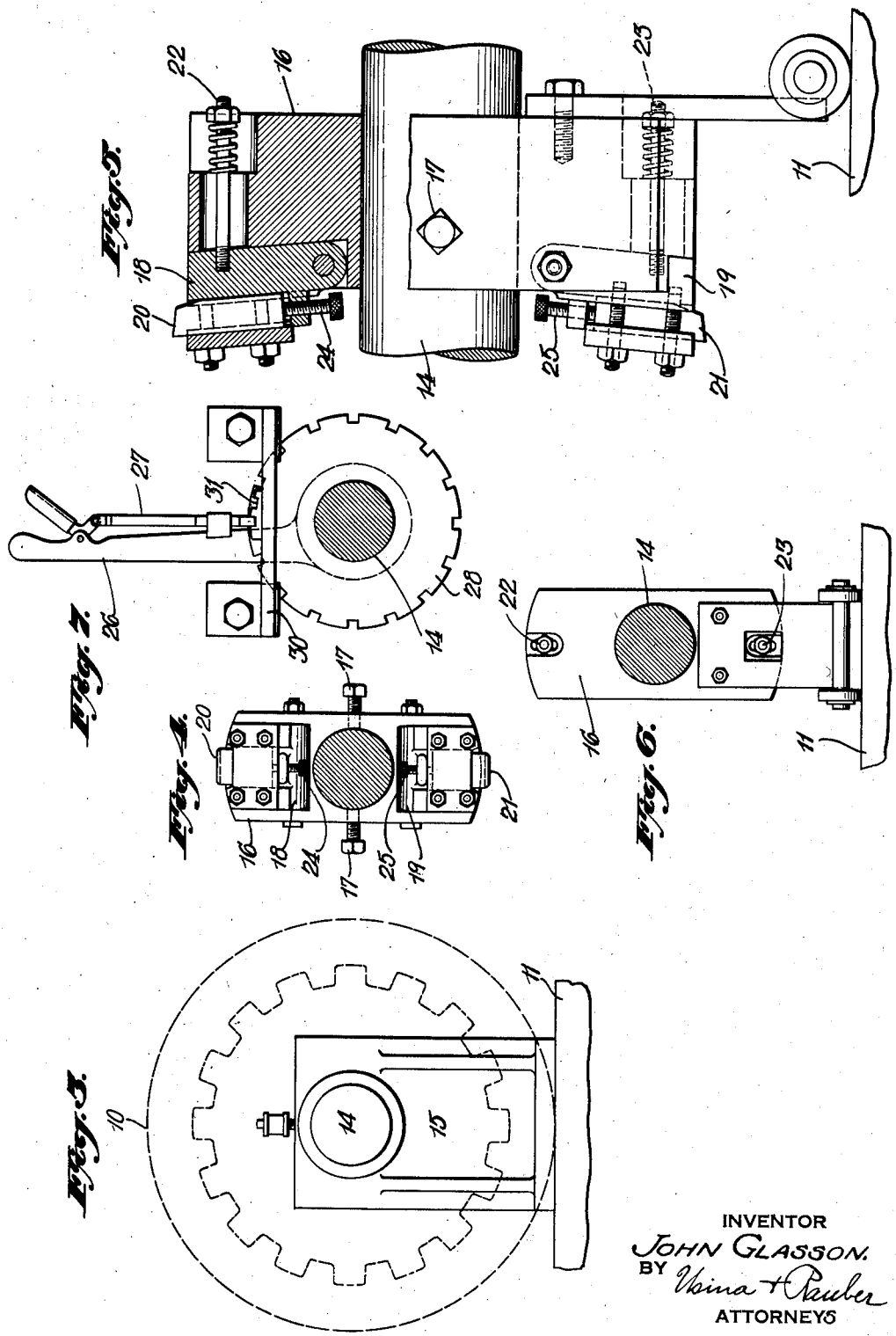
INVENTOR
JOHN GLASSON.
BY
ATTORNEYS Patented Nov. 27, 1934

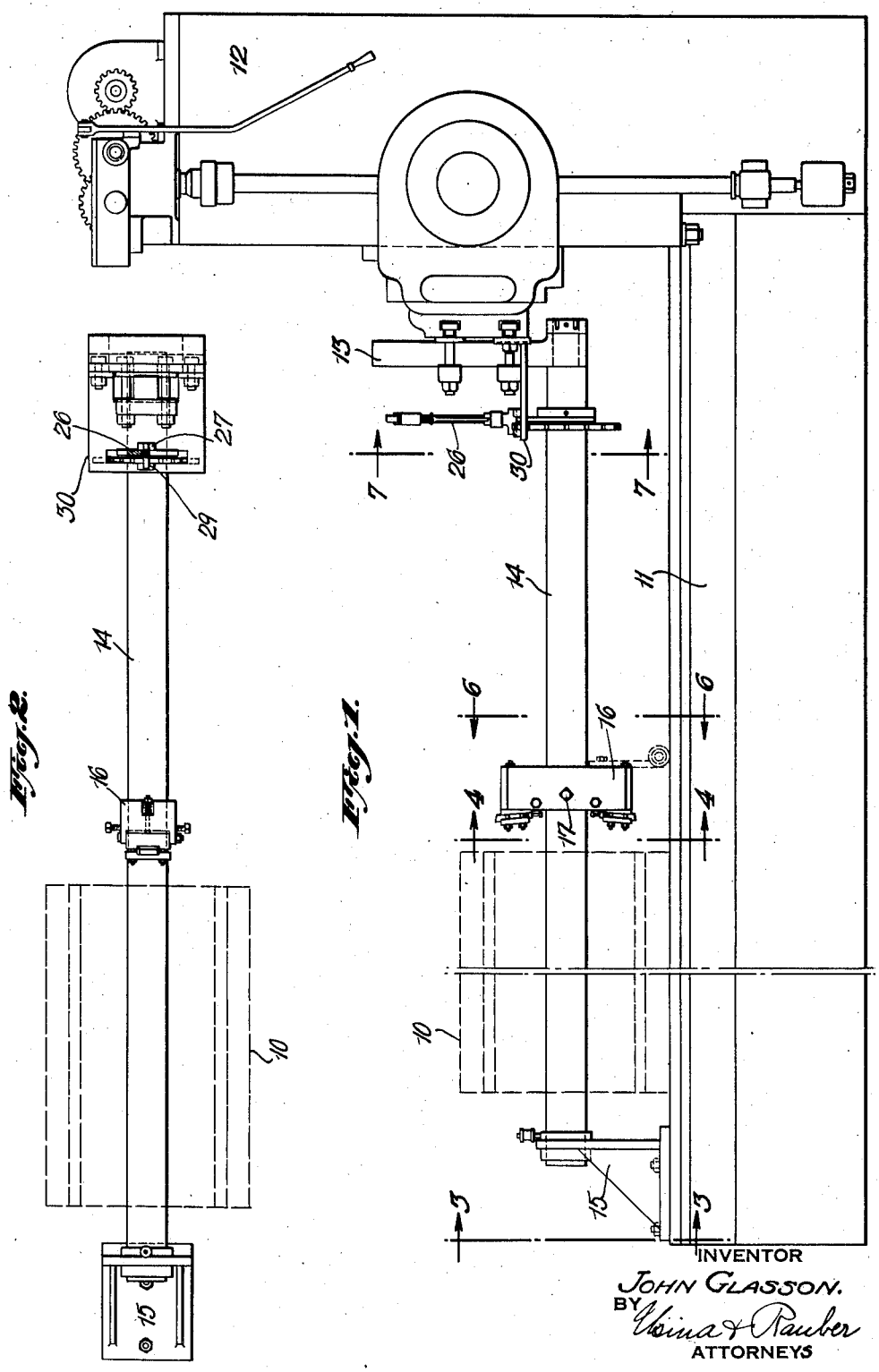

1,982,425

UNITED STATES PATENT OFFICE 1,982,425

BORE CUTTING APPARATUS

John Glasson, Johnstown, Pa.

Application April 6, 1933, Serial No. 664,828

4 Claims. (Cl. 90—24)

My invention relates to apparatus that may be mounted on planers and similar mechanisms to cut flutings or other grooves in the bore or internal surface of couplings and similar hollow articles or to cut longitudinal faces therein to a bore of hexagonal, octagonal or other polygonal cross section.

Objects of the invention are to provide a mechanism of the above type that may be readily mounted on a planer and in which the various grooves or faces may be quickly and accurately cut or formed without rotating or otherwise moving the coupling or work piece after clamping it in place and in which the cutters are supported against distortion through springing and in which cutters of simple construction may be employed.

In my invention the coupling or other hollow article to be bored or fluted is clamped in position on the planer table. A shaft is then passed through the bore of the coupling and rotatably secured at one end in a rest mounted on the planer table and at the other in a stationary tool post. A cutter carrying head is mounted in fixed position on the shaft and provided with cutters in balanced position so as to engage the inner surface of the work piece. The planer table is then moved longitudinally of the fixed shaft and cutter head thereby cutting longitudinal grooves in the inner surface of the piece. The balanced arrangement of the cutters balances their reactions to the work piece and eliminates a springing action on the shaft. When a cut is completed the planer table is returned, thereby returning the cutter head to its original position. The shaft is then given a partial rotation and the operations repeated until the desired number of cuts have been formed to the required depth.

The various features of the invention as illustrated in the accompanying drawings, in which Fig. 1 is a side elevation of a part of a planer table and of cutting apparatus embodying a preferred form of my invention;

Fig. 2 is a plan view of the cutter mechanism;

Fig. 3 is an end view of the cutter apparatus taken from line 3—3 of Fig. 1;

Fig. 4 is a vertical section of the cutter head on line 4—4 of Fig. 1;

Fig. 5 is a longitudinal vertical section of the cutter head;

Fig. 6 is a vertical section of the cutter head on line 6—6 of Fig. 1;

Fig. 7 is a section of the shaft rotating means taken on line 7—7 of Fig. 1.

In the accompanying drawings a coupling 10 or other hollow or bored work piece is clamped or secured to a planer table 11, by any suitable means, not shown. The planer table 11 is movable longitudinally relative to a fixed tool post 12. The tool post 12 carries a shaft support 13, in which is rotatably mounted one end of a shouldered shaft 14 that extends from the support through the work piece 10 and is rotatably and slidably mounted in a shaft support 15 carried on the planer table 11. When the planer table 11 moves toward the post 12 the work piece 10 and shaft support 15 move with it and the shaft 14, being stationary, has a relative movement in the opposite direction through the axis of the work piece.

Prior to the above movement a cutter head 16 is fixed on the shaft 14 between the work piece 10 and the post 12 and adjacent the end of the piece 10. The cutter head may be secured on the shaft 14 by a cross bolt 17 or other suitable fastening means to hold it against longitudinal or rotative movement on the shaft. It is rotated with and by the shaft 14.

A pair of hinged cutter blocks 18 and 19 are mounted on the cutter head 16 on diametrically opposite sides of the shaft 14 and carry cutters 20 and 21. The cutter blocks 18 and 19 are drawn against a retaining face of the head 16 by springs 22 and 23 which hold them in position during the cutting stroke but permit them to swing out of cutting position on the return stroke. Before beginning a cutting stroke the cutters are adjusted in their respective blocks, by means of adjusting screws 24 and 25, so that the cutting edges are spaced apart a slightly greater distance, for example one thirty-second of an inch, than the diameter of the bore to be fluted or grooved.

As the planer table moves toward the post 12 carrying with it the work piece 10 and support 15, the cutter head 16 and cutters 20 and 21, being held stationary on the shaft 14, traverse the bore of the work piece from one end to the other cutting a longitudinal groove or fluting or face therein. The return movement of the planer table returns the cutter head and piece 10 to their original relative positions. The shaft 14 and with it the cutter head 16 are then rotated through a predetermined angle and a new groove cut and successive cuts are made in this manner until the required number of grooves or faces are cut. The cutters are then moved outwardly and these operations are repeated until the grooves or faces have been cut to the desired depth.

The shaft 14 may be rotated between cuts by any suitable means. In the embodiment shown in the drawings it is rotated by a latch lever 26 rotatably mounted on the shaft 14 and having a manually operable latch 27 to engage a selected notch in the periphery of plate 28 fixed on the shaft 14 and, when this notch is brought into alignment with a notch 29, Fig. 2, on a latch plate 30 to engage the notch 29 and lock the plate or disc 28 and the shaft 14 in fixed angular position. The disc 28 has as many notches as there are grooves or flutings to be made in the piece, sixteen being shown by way of example, and when two cutters are used the required number of grooves will be cut with a half turn of the disc 28 in steps of one notch or a total of eight.

It will be understood that changes may be made in the form and arrangement of the parts. For example, one cutter may be employed if the balancing reactions are not required or more than two cutters may be employed. The cutters 20 are so held that they may be made of bar stock without forging but forged cutters may be employed if desired. When a finished coupling or work is to be removed and replaced by a new work piece the cutter head 16 may be temporarily supported by the carriage 31. Latch plate 30 in addition to notch 29 can have a second notch 31 so located as to bring the cutters to an intermediate position between the flutes, thus it is possible to machine from the rough, the entire interior of a coupling, or similar work.

What I claim is:

1. A bore cutting apparatus comprising a movable work-holding table and shaft support, a fixed post, a shaft rotatably mounted in fixed longitudinal position between said post and support, a cutter head fixed on said shaft, means to rotate and hold said shaft to fixed angular positions and a pair of cutters hinged on diametrically opposite positions on said cutter head.

2. A bore cutting apparatus comprising a movable work-holding table and shaft support, a fixed post, a shaft rotatably mounted in fixed longitudinal position between said post and support, a cutter head fixed on said shaft, means to rotate and hold said shaft to fixed angular positions, said means comprising a notched plate fixed on said shaft, a latch lever rotatably mounted on said shaft to engage selected notches on said plate, a latch plate to hold said latch lever and cutters mounted in balanced position on said cutter head.

3. A bore cutting apparatus comprising a work-holding table and shaft support, a post, a shaft rotatably mounted between said post and support and in fixed longitudinal position relative to said post, said work-holding table and shaft support having a longitudinal movement relative to said post, a cutter head fixed on said shaft between said shaft support and said post and means to rotate and hold said shaft in fixed angular position.

4. A bore cutting apparatus comprising a work-holding table and shaft support, a post, a shaft rotatably mounted between said post and support and in fixed longitudinal position relative to said post, said work-holding table and shaft support having a longitudinal movement relative to said post, a cutter head fixed on said shaft between said shaft support and said post, means to rotate and hold said shaft in fixed angular position and cutters mounted in balanced position on said cutter head.

JOHN GLASSON.